(12) United States Patent
Pargansky

(10) Patent No.: US 8,763,818 B1
(45) Date of Patent: Jul. 1, 2014

(54) KITCHEN SINK ORGANIZER

(71) Applicant: Richard Pargansky, Bridgewater, NJ (US)

(72) Inventor: Richard Pargansky, Bridgewater, NJ (US)

( * ) Notice: Subject to any disclaimer, the term of this patent is extended or adjusted under 35 U.S.C. 154(b) by 4 days.

(21) Appl. No.: 13/789,867

(22) Filed: Mar. 8, 2013

(51) Int. Cl.
| | |
|---|---|
| *A47G 19/08* | (2006.01) |
| *A47F 3/14* | (2006.01) |
| *A47J 47/00* | (2006.01) |
| *A47L 17/00* | (2006.01) |
| *A47J 47/20* | (2006.01) |
| *A47L 19/04* | (2006.01) |
| *A47J 47/16* | (2006.01) |
| *A47L 19/02* | (2006.01) |
| *A47L 17/02* | (2006.01) |

(52) U.S. Cl.
CPC .................. *A47L 17/00* (2013.01); *A47J 47/20* (2013.01); *A47L 19/04* (2013.01); *A47J 47/16* (2013.01); *A47L 19/02* (2013.01); *A47L 17/02* (2013.01)
USPC .......... 211/41.3; 211/10; 211/128.1; 220/572; 312/229

(58) Field of Classification Search
CPC ....... A47F 5/16; A47F 7/0042; A47F 7/0064; A47F 3/14; A47F 5/0025; A47F 5/0018; A47F 7/144; A47F 7/145; A47L 19/04; A47L 19/02; A47L 19/00; A47L 15/501; A47L 17/00; A47L 17/02; A47L 13/50; A47L 13/51; A47L 13/512; A47L 13/10; A47L 15/50; A47L 15/502; A47L 15/503; A47L 15/505; A47J 47/20; A47J 47/00; A47J 47/16; A47K 1/04; A47B 81/02; A47B 81/04; A47B 33/00; E03C 1/181; E03C 1/186; A47G 19/08

USPC ................ 211/132.1, 127.1, 13.1, 41.3, 41.6, 211/126.2, 10, 128.1, 133.1, 65, 41.11; 206/373, 362, 362.1, 362.3; 312/229, 312/228, 228.1; 4/654, 656, 658, 650; 220/571, 572, 23.88, 23.87, 23.86, 220/501, 503, 507; D32/55, 56, 58, 59
See application file for complete search history.

(56) References Cited

U.S. PATENT DOCUMENTS

| | | | | |
|---|---|---|---|---|
| 1,928,594 | A | * | 9/1933 | Kearney ......................... 312/283 |
| 2,283,301 | A | * | 5/1942 | Waddell ......................... 312/118 |
| 2,972,414 | A | * | 2/1961 | Sipe ............................ 211/41.11 |
| 4,085,987 | A | * | 4/1978 | Vartdal ........................... 312/269 |
| 4,446,972 | A | * | 5/1984 | Sussman .......................... 211/26 |
| 4,756,582 | A | * | 7/1988 | Heien ............................ 312/229 |
| 4,799,744 | A | * | 1/1989 | Toy ................................ 312/229 |
| 4,884,714 | A | * | 12/1989 | Bechtel .......................... 220/630 |
| 5,012,934 | A | * | 5/1991 | Newhall ........................ 211/41.3 |
| 5,109,990 | A | * | 5/1992 | Murphy et al. ............... 211/41.3 |
| D327,343 | S | * | 6/1992 | Gannon .......................... D32/58 |

(Continued)

*Primary Examiner* — Jennifer E Novosad

(57) ABSTRACT

A kitchen sink organizer is disclosed that provides for a housing with a sloping dish washing detergent reservoir in a bottom base area, a reservoir insert that rests inside the reservoir that allows for degrees of penetration of dish washing implements such as sponges, soap pads and the like, and a plurality of reservoir covers that are formed with open channels through which liquid can drip back into the reservoir when the washing implements are placed on the covers, and where the housing also provides for an upper storage area for sponges, scrub pads, brushes dish towels, a bar of soap, and a ring or wrist watch, and also for a plurality of swinging hanging rods and rod sleeves that are molded onto the outer walls of the housing and which a user can swing outwardly for placement of a damp dish towel or rubber cleaning gloves.

5 Claims, 9 Drawing Sheets

(56) References Cited

U.S. PATENT DOCUMENTS

| | | | | |
|---|---|---|---|---|
| 5,119,943 A | * | 6/1992 | Hoang | 211/41.3 |
| 5,184,749 A | * | 2/1993 | Attenasio | 220/572 |
| 5,238,106 A | * | 8/1993 | Nguyen et al. | 206/223 |
| 5,460,276 A | * | 10/1995 | McKeon et al. | 211/70.7 |
| 5,590,804 A | * | 1/1997 | Crum et al. | 220/483 |
| 5,657,880 A | * | 8/1997 | Birnbaum | 211/50 |
| 5,678,733 A | * | 10/1997 | Ong | 222/108 |
| 5,713,552 A | * | 2/1998 | Diamant | 248/460 |
| 5,934,486 A | * | 8/1999 | Jarvis et al. | 211/41.8 |
| 6,135,276 A | * | 10/2000 | French et al. | 206/225 |
| 6,223,900 B1 | * | 5/2001 | Pappas | 206/576 |
| 6,491,170 B1 | * | 12/2002 | Madela | 211/41.3 |
| 6,530,502 B2 | * | 3/2003 | Neal | 222/192 |
| 6,705,468 B1 | * | 3/2004 | Hall | 206/581 |
| 6,805,246 B1 | * | 10/2004 | Manabat | 211/13.1 |
| 6,886,702 B2 | * | 5/2005 | Trinidad et al. | 211/181.1 |
| 7,669,721 B2 | * | 3/2010 | Kemper et al. | 211/41.3 |
| 8,684,192 B1 | * | 4/2014 | Margolin | 211/41.3 |
| 2002/0029993 A1 | * | 3/2002 | Wang | 206/546 |
| 2004/0099617 A1 | * | 5/2004 | Elias et al. | 211/41.3 |
| 2006/0289372 A1 | * | 12/2006 | Yang et al. | 211/41.3 |
| 2007/0151018 A1 | * | 7/2007 | Palkon | 4/630 |
| 2007/0193651 A1 | * | 8/2007 | Kauzlarich | 141/86 |
| 2008/0017596 A1 | * | 1/2008 | Brock | 211/10 |
| 2008/0067138 A1 | * | 3/2008 | Burgess et al. | 211/71.01 |
| 2008/0104747 A1 | * | 5/2008 | Mulaw | 4/658 |
| 2009/0288979 A1 | * | 11/2009 | Han et al. | 206/561 |
| 2010/0059460 A1 | * | 3/2010 | Mulaw | 211/41.3 |
| 2010/0176017 A1 | * | 7/2010 | Yang et al. | 206/373 |
| 2010/0288659 A1 | * | 11/2010 | Dang | 206/277 |

* cited by examiner

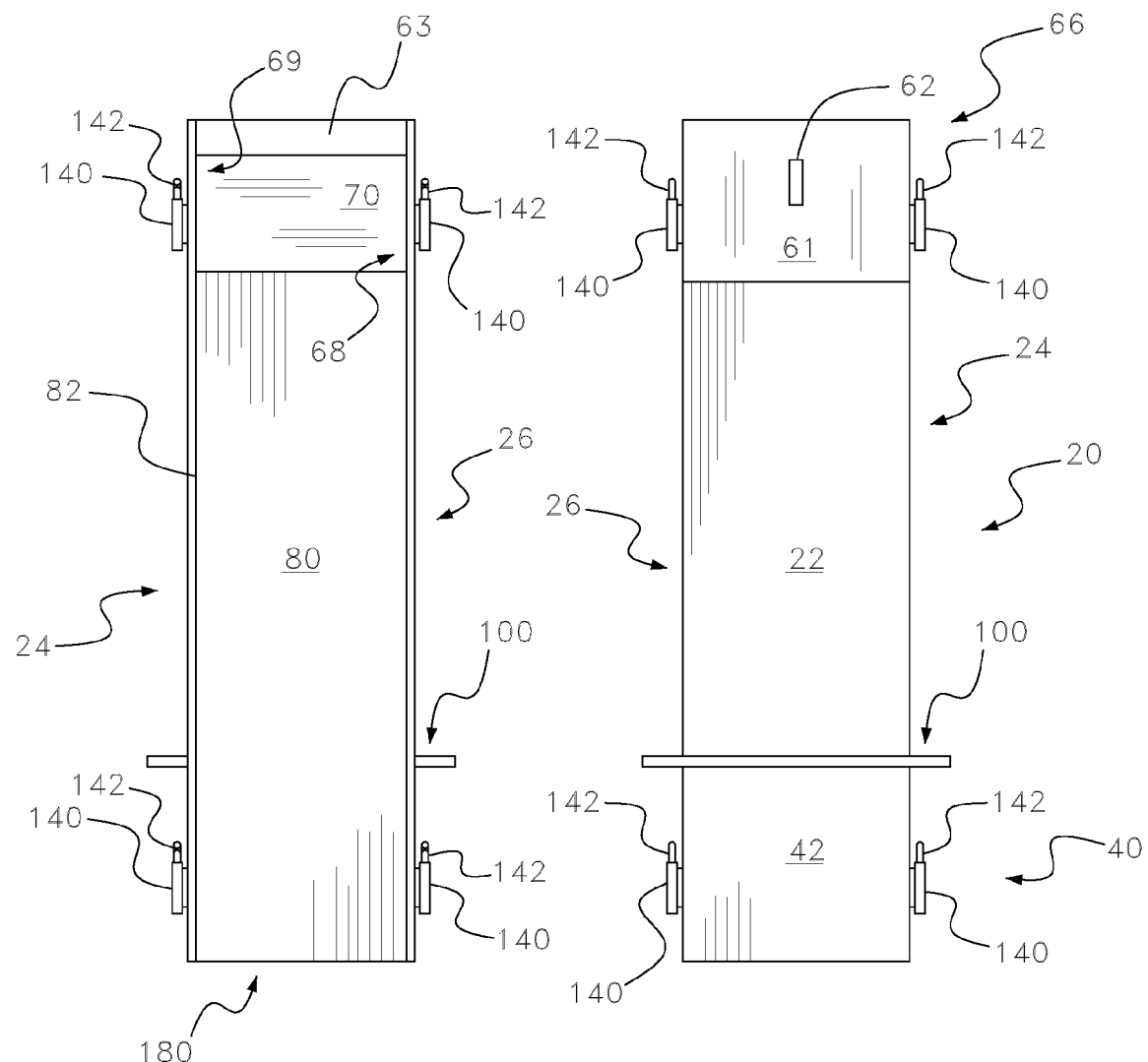

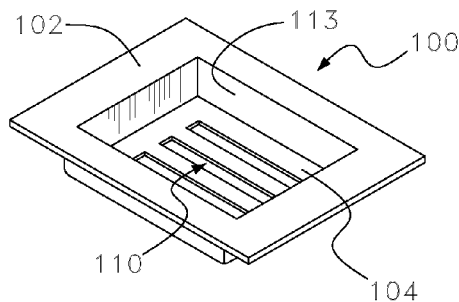
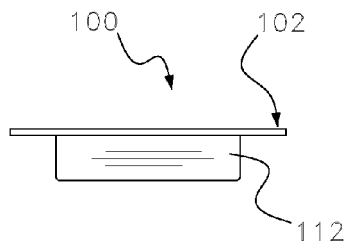
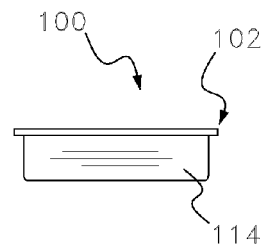
Fig. 11    Fig. 12    Fig. 13
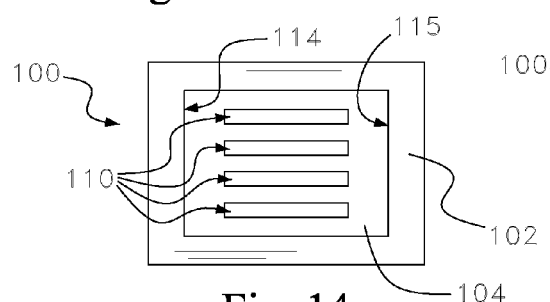
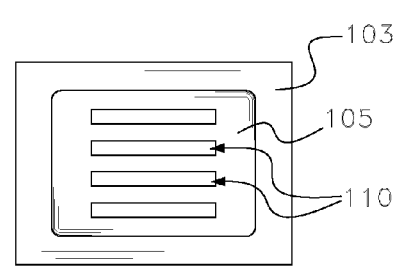
Fig. 14    Fig. 15
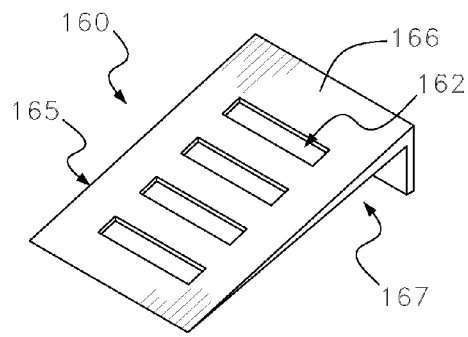
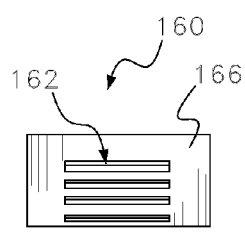
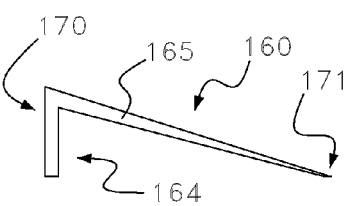
Fig. 16    Fig. 17    Fig. 18
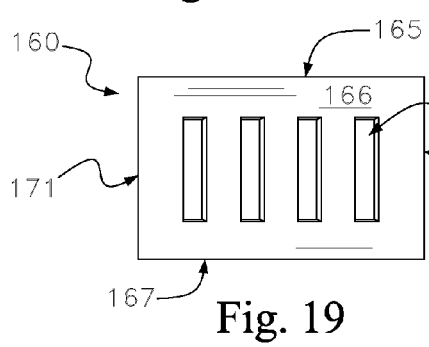
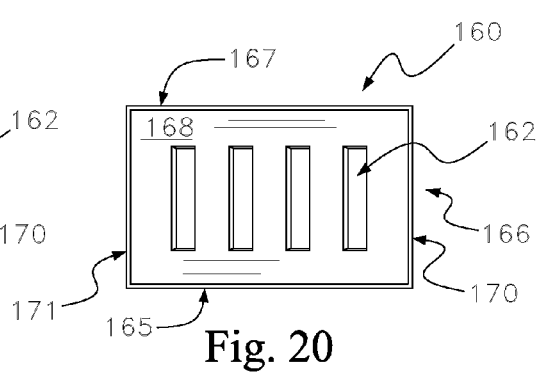
Fig. 19    Fig. 20

KITCHEN SINK ORGANIZER

FIELD OF THE INVENTION

The present invention relates in general to kitchen sink organizers, and more specifically to a device that aids in cleaning dishes, pots, pans and the like by supplying a detergent reservoir for a one step application of liquid detergent to cleaning implements such as a sponge, scrub pad, brush and the like as well as providing a storage area for such implements and storage of a bar of soap and a hook for hanging a wrist watch or rings with additional capability for hanging wet or damp kitchen towels or rubber gloves.

BACKGROUND OF THE INVENTION

Washing dishes by hand at a kitchen sink typically is a two handed operation. One hand selects a sponge, scrub pad, brush or another cleaning implement, while the other hand lifts a bottle of dish washing detergent and squeezes the bottle to pour detergent on to the cleaning implement. Some sinks come equipped with a dish washing detergent dispensing device built into the top of the sink and applying dish soap involves a repeated pumping motion. What is needed for people who clean dishes by hand is a device that makes this process easier and more convenient.

SUMMARY OF THE INVENTION

The present invention overcomes the disadvantages and shortcomings of the problems of the prior art by providing for the application of dish washing detergent to a cleaning pad or sponge in one controlled dipping motion. In one embodiment, the system is comprised of a housing unit with a base portion that provides a sloping detergent reservoir, an insert that determines the depth to which a cleaning implement can be inserted into the reservoir, and a plurality of reservoir covers. When the cleaning process begins, the user selects a cleaning implement such as a sponge or scrub pad from a storage area on the upper section of the unit, removes one or more of the reservoir covers, and dips the cleaning implement into the detergent reservoir at a desired depth defined by the insert. Only one hand is required. The invention also provides a number of functions to make cleaning more convenient, reducing clutter, and for storing cleaning implements which may not be in use at any particular moment such as sponges of varying coarseness while using others.

The invention herein also provides for the ability to dry rubber gloves that had been worn during the washing process by providing rotating rods which are stored against the sides of the housing unit when not in use and rotated to any desired position including being paced over the sink to allow for any dripping liquid to fall directly into the sink. Damp or wet dish washing towels can likewise be accommodated. The device can be conveniently placed on either side of the sink faucet or on either side of the sink counter top to accommodate different sink configurations as well as left or right handedness of the user.

BRIEF DESCRIPTION OF THE DRAWINGS

For a more complete understanding of the present invention, reference is made to the following detailed description of the exemplary embodiment(s) considered in conjunction with the accompanying drawing in which:

FIG. 8 is a rear devotional view of the kitchen sink organizer;

FIG. 9 is a front elevational view of the kitchen sink organizer;

FIG. 11 is a perspective view of a reservoir cover of the kitchen sink organizer;

FIG. 12 is a front elevational view of a reservoir cover of the kitchen sink organizer, a rear elevational view being a mirror image thereof;

FIG. 13 is a right side elevational view of a reservoir cover of the kitchen sink organizer, a left side elevational view being a mirror image thereof;

FIG. 14 is a top plan view of a reservoir cover of the kitchen sink organizer;

FIG. 15 is a bottom plan view of a reservoir cover of the kitchen sink organizer;

FIG. 16 is a perspective view of a reservoir base insert of the kitchen sink organizer;

FIG. 17 is a front elevational view of a reservoir base insert of the kitchen sink organizer;

FIG. 18 is a left side elevational view of a reservoir base insert of the kitchen sink organizer a right side elevational view being a mirror image thereof;

FIG. 19 is a top plan view of a reservoir base insert of the kitchen sink organizer; and FIG. 20 is a bottom plan view of a reservoir base insert of the kitchen sink organizer.

DETAILED DESCRIPTION OF THE EXEMPLARY EMBODIMENTS

Figure 1:
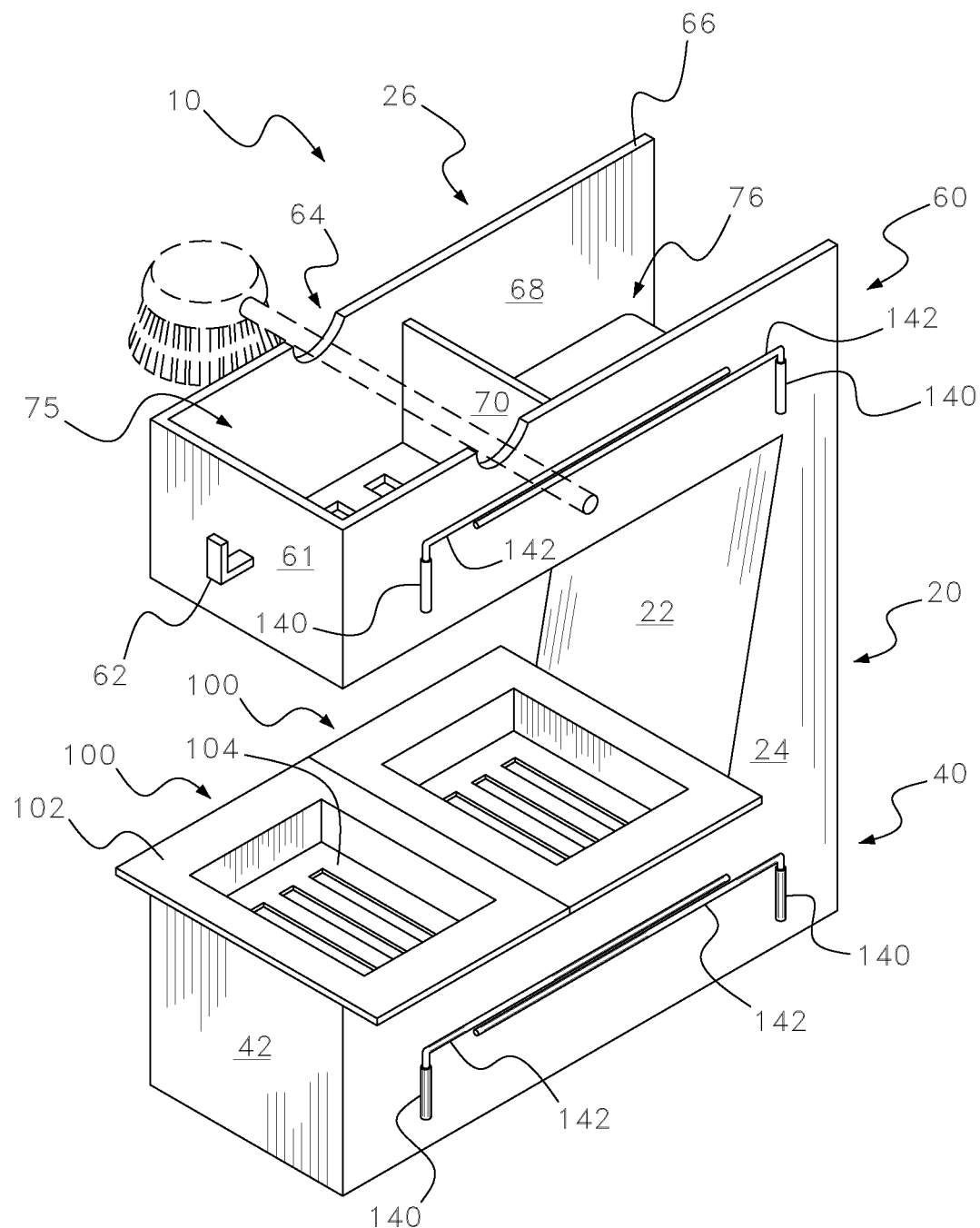
FIG. 1 is a perspective view of the kitchen sink organizer.
Figure 2:
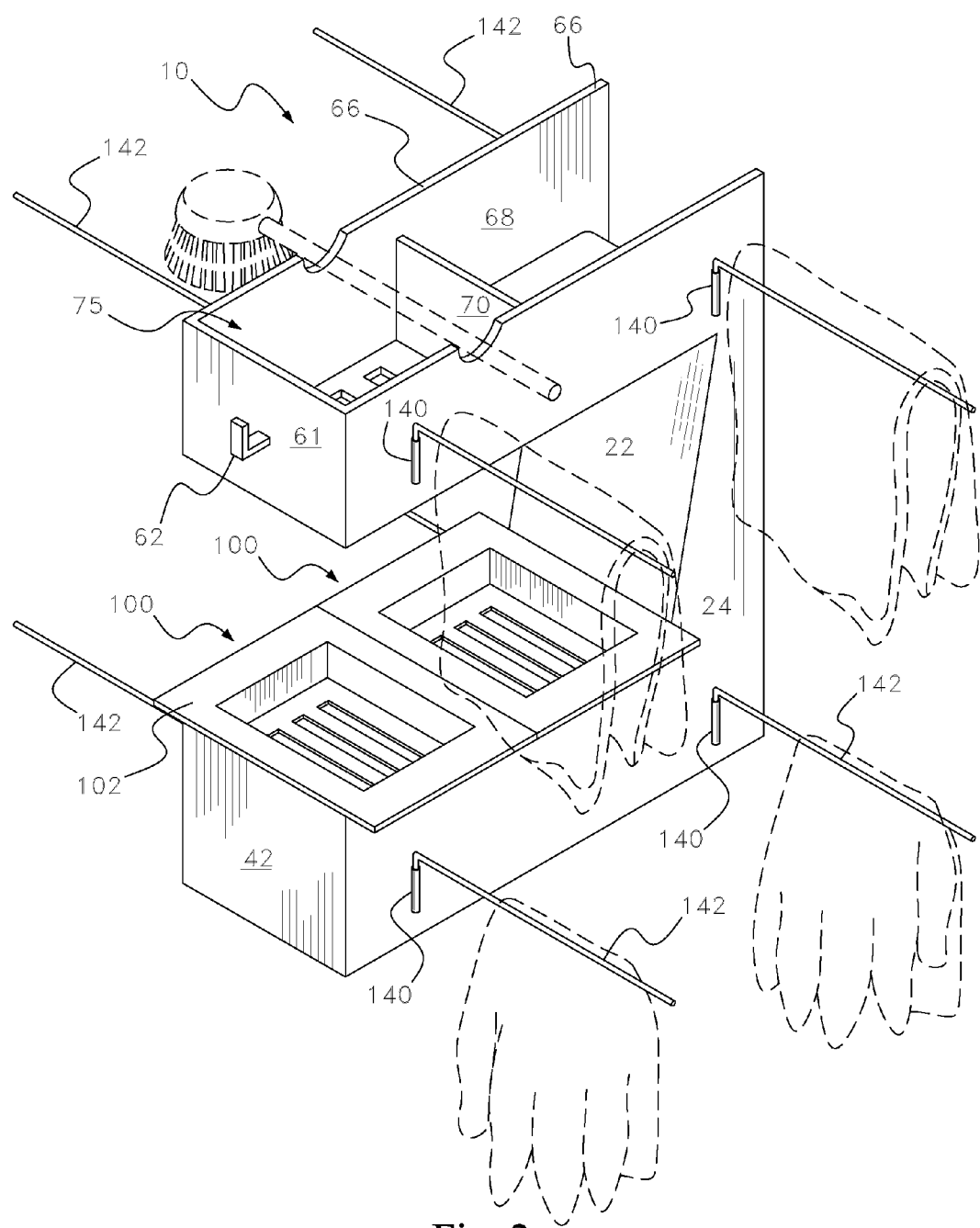
FIG. 2 is a perspective view of the kitchen sink organizer showing the hanging rods in use.

Referring to FIGS. 1-10, a kitchen sink organizer 10, constructed in accordance with the present invention, is shown to include a central housing 20, a bottom reservoir base section 40 which is located at a first, lower, distal end, and on which the kitchen sink organizer 10 stands, and which extends outwardly from the housing 20, as well as an upper storage section 60 which is located at a top, second distal end, opposite the first lower, distal end and which also extends outwardly from the housing 20. The central housing 20 is designed with a front wall 22 that slopingly extends from the bottom reservoir base section 40 to the upper storage area 60, such that it is not perpendicular to the bottom reservoir base section 40 nor to the upper storage area 60, whereas the rear face 80 of the central housing 20, opposite the front wall 22 is substantially perpendicular thereto. Right and left side wails, 24, 26 of the kitchen sink organizer 10 are essentially C-shaped to include the bottom reservoir base section 40, the central housing 20, and the upper storage section 60. As shown in FIG. 8, the rear surface 80 of the central housing 20 is recessed opposite the sloping front wall 22 to form a rear edging 82 which is substantially perpendicular to the bottom reservoir base section 40 and the top storage area 60 and which extends the vertical length of the kitchen sink organizer 10 on corresponding left and right sides.

Figure 3:
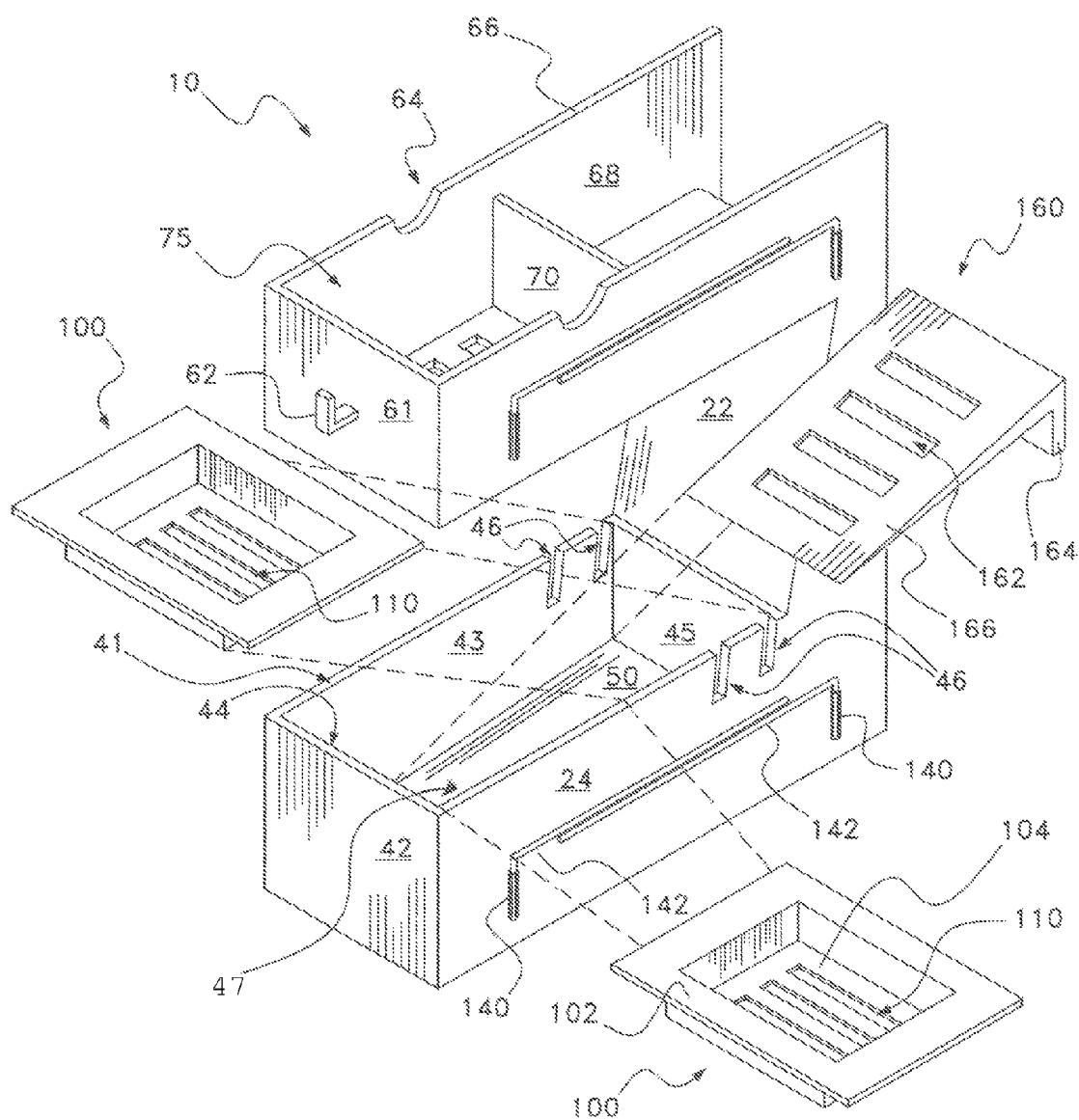
FIG. 3 is a perspective exploded view of the kitchen sink organizer.
Figure 5:
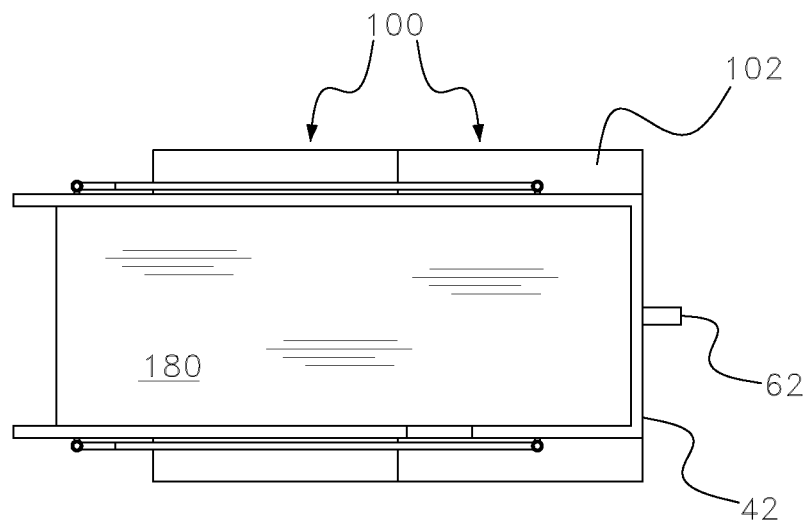
FIG. 5 is a bottom plan view of the kitchen sink organizer.
Figure 6:
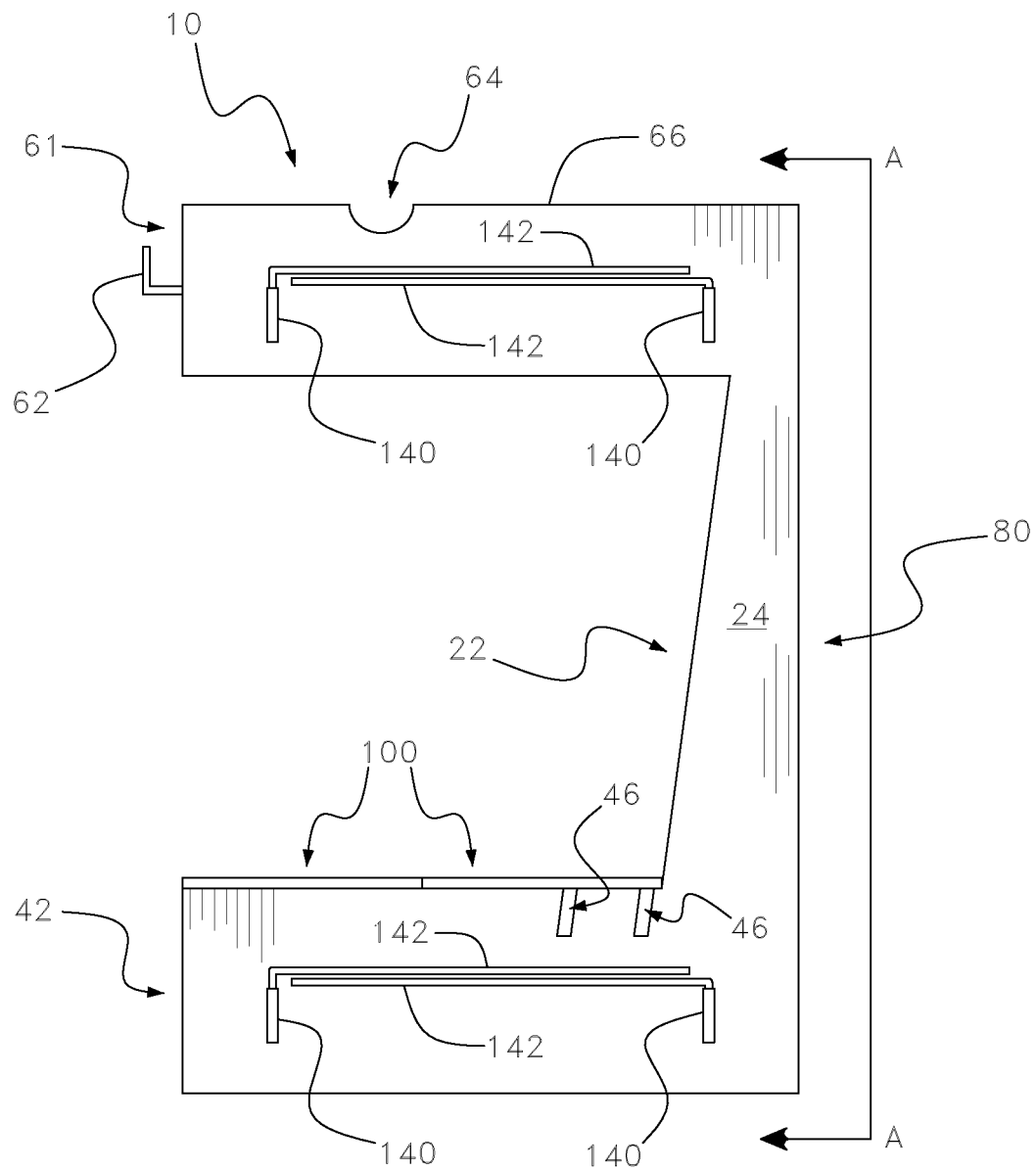
FIG. 6 is a right side elevational view of the kitchen sink organizer, a left side being a mirror image thereof.
Figure 10:
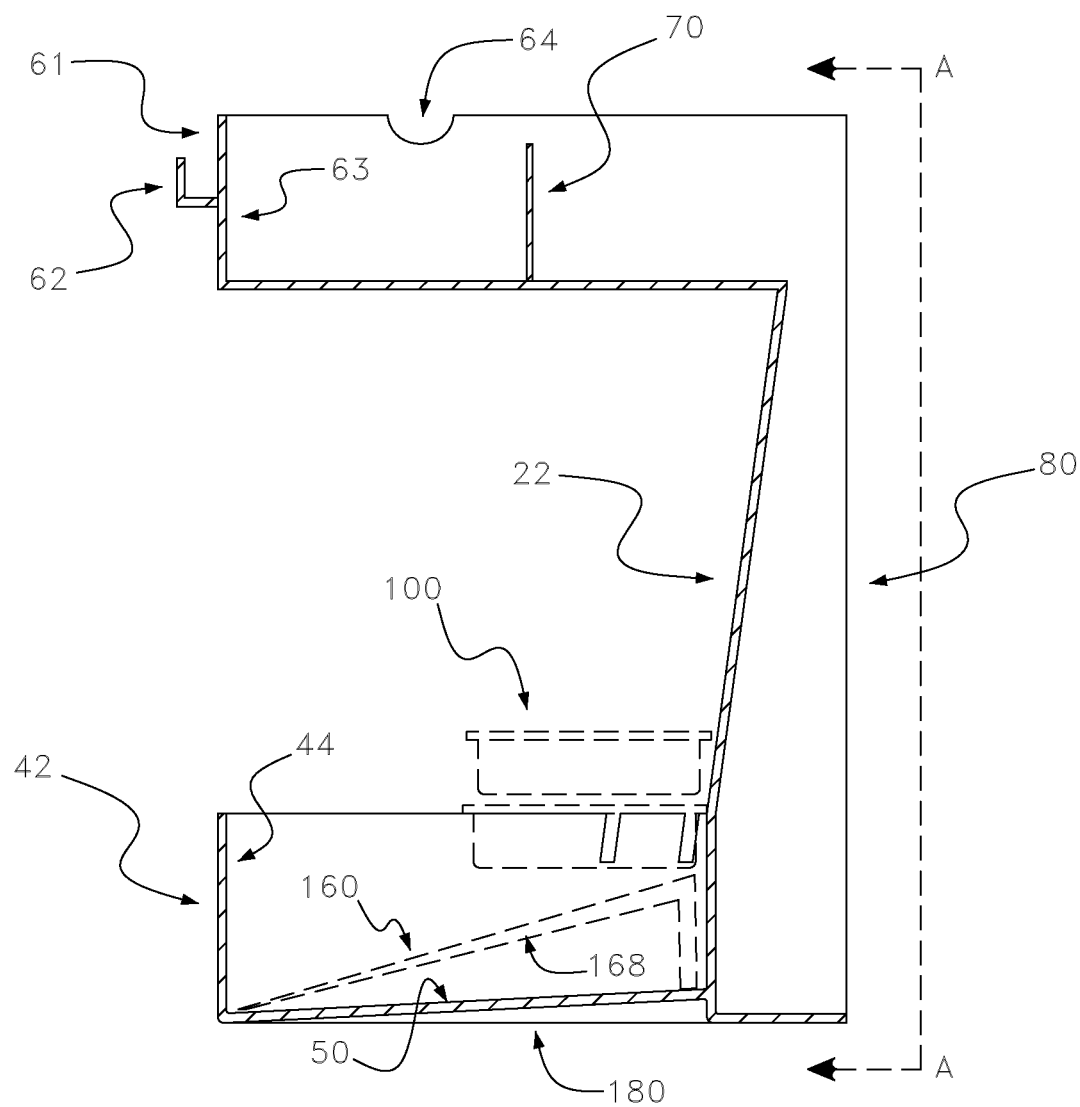
FIG. 10 is a right side cross sectional view of the kitchen sink organizer taken thru line A-A.

Referring to FIGS. 3, 5 and 10, the bottom reservoir base section 40 of the kitchen sink organizer 10 provides for a substantially rectangular detergent reservoir defined by reservoir bottom surface 50 that slopes downwardly from reservoir inner rear wall 45 toward reservoir inner front wall 44, where reservoir inner front wall 44 is opposite base outer front wall 42, and where the reservoir is further bound by reservoir inner left wall 43 and reservoir inner right wall 47. The upper distal edges of the reservoir inner walls 43, 44, 46, 47 form the reservoir upper lip 41 onto which reservoir covers 100 can be placed.

Figure 7:
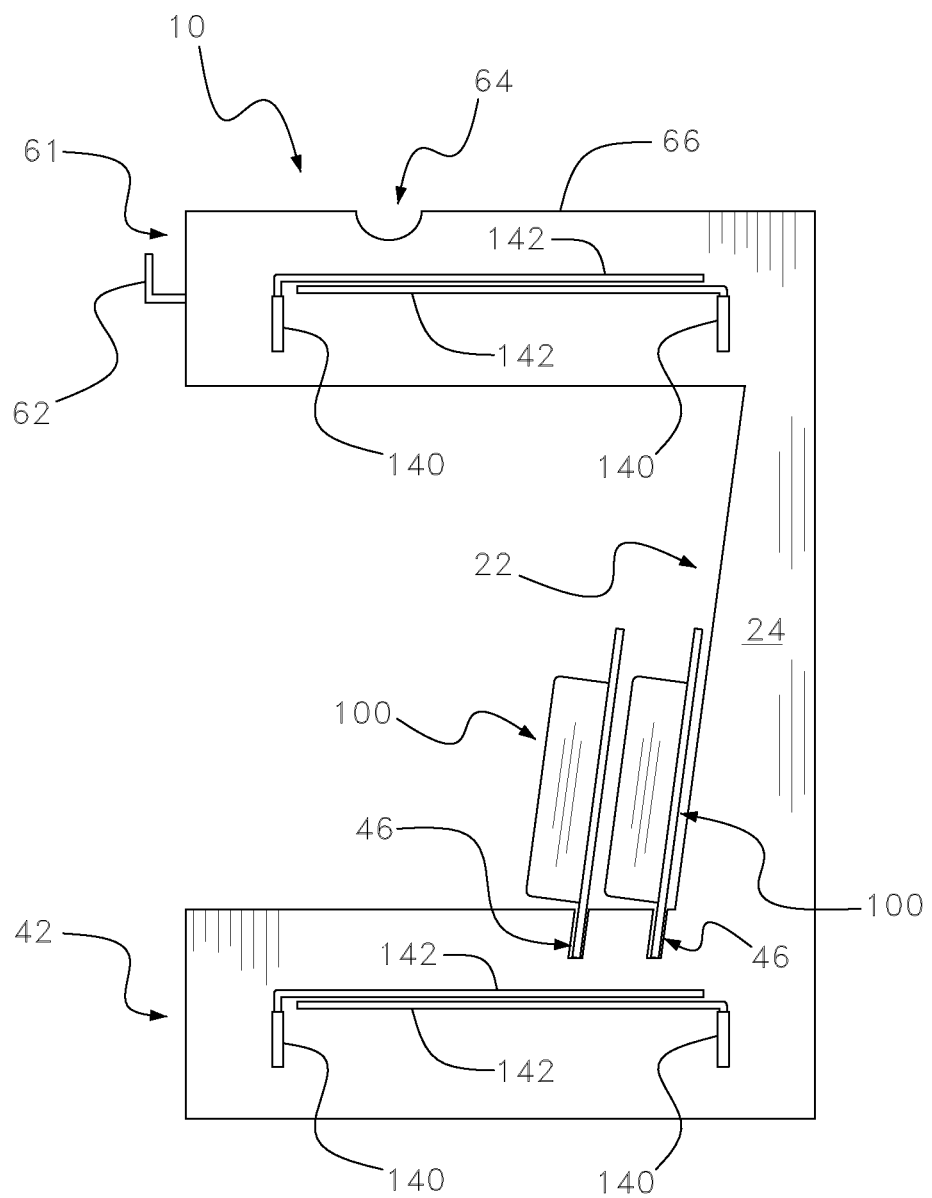
FIG. 7 is a right side elevational view, showing the kitchen sink organizer with reservoir covers in a stored position.

The sloping of the reservoir inside bottom surface 50 ensures that liquid detergent will be found by a user in the area near the inner front wall 44 at all times, so that detergent can be applied to a sponge or scrub pad in that area. As can be seen in FIGS. 3, 7 and 10, the reservoir upper lip 41 includes two pairs of cut outs 46 that extend downwardly from the reservoir upper lip 41 toward the reservoir inside bottom surface 50 at substantially the same angle as the front wall 22 at corresponding locations of the right wall 24 and the left wall 26 to accommodate sliding placement of the flanges 102 of the reservoir covers 100 which allow a user access to the detergent in the reservoir to apply to a sponge or other cleaning implement during a typical cleaning operation. As shown more clearly in FIG. 5, the bottom surface 180 of the kitchen sink organizer 10 is substantially rectangular and planar.

Referring now to FIGS. 1-3 and 11-15, reservoir covers 100 are removably paced on the reservoir upper lip 41 by means of cover flanges 102 during a typical dish washing activity. Reservoir covers 100 are substantially rectangular with a circumferential flange 102 and recessed upper middle surface 104, providing a front wall 112 that is substantially perpendicular to the flange 102, a rear wall opposite the front wall, 113, a left wall 114 and a right wall 115 opposite the left wall 114. The reservoir covers 100 also include a series of open channels 110 located in the recessed upper middle surface 104, each of which extends from the left side wall 114 to the right side wall 115 at regular intervals. The configuration of the reservoir covers 100 allow detergent or water droplets to drip back into the reservoir through the channels 110 when the washing implements are placed on top of the reservoir covers 100.

Referring now to FIGS. 3, 10 and 16-20, the kitchen sink organizer 10 provides for a reservoir insert 160 removably placed onto the reservoir inner bottom surface 50 of the bottom reservoir base section 40 and which provides an area lower than that of the covers 100 on which a sponge may be moistened with liquid detergent at various depths. The reservoir insert 160 consists of a sloping rectangular upper surface 166, and a sloping bottom surface 168 opposite thereto, and a plurality of insert channels 162 which extend from insert left wall 165 toward insert right wall 167, and which allow passage of liquid detergent during use. The upper surface 166 of the reservoir insert 160 slopes downwardly from rear wall 170 to front edge 171. A step 164 is designed along the rear wall 170 to form the slope of the upper surface 166.

Referring now to FIG. 10, during a typical cleaning process, the reservoir insert 160 is removably placed onto the reservoir top surface 50 of the bottom reservoir base section 40. Reservoir covers 100 can be stacked one on top of the other, or alternatively placed vertically as shown in FIG. 7, to allow a user access to liquid detergent stored or placed into the bottom reservoir base section 40. The sloping upper surface 166 of the reservoir insert 160 allows the user to access liquid detergent at variable levels.

Referring now to FIGS. 1-4, the kitchen sink organizer 10 includes upper storage section 60 which is designed and configured with open top areas separated by a midpoint wall 70 for placement of a scrubbing brush and bar of soap or other cleaning implements for storage or drying. The upper storage section 60 extends outwardly from the central housing 20 toward an outer front wall 61 onto which an essentially L-shaped hook 62 is uniformly molded to provide an additional structure for hanging a ring, wrist watch or a dish towel. Inner front wall 63, opposite the outer front wall 61 along with left inner wall 68 and right inner wall 69 opposite the left inner wall 68 provide the open areas 75, 76 for storage and drainage, separated into two even sections by midpoint wall 70. The top lip 66 of the upper storage area 60 extends in a substantial U-shape from the rear edging 82 toward the outer front wall 61 and is formed by the upper section of the outer walls, 24, 26 and the upper storage section inner walls 63, 68, 69. This top lip 66 includes a pair of half-circle cut outs 64 which extend downwardly from the top lip 66 and which can be used for storage of a scrubbing brush or similar implement.

Figure 4:
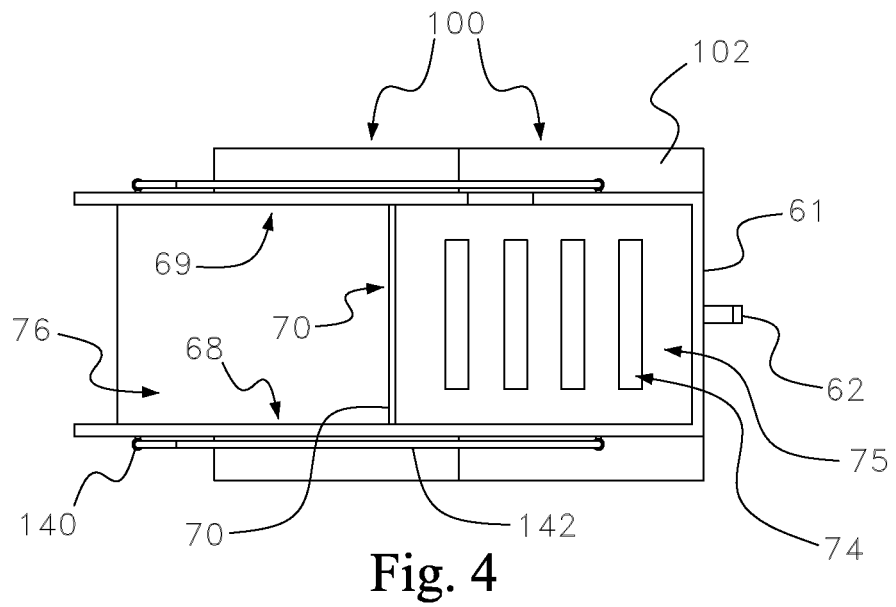
FIG. 4 is a top plan view of the kitchen sink organizer.

Seen clearly in FIG. 4, storage area 75 includes a series of open channels 74 to allow for liquid dripping off a stored sponge or scrub brush to pass through. Conversely, storage area 76 of the upper storage area 60 does not include such channels, but instead is designed with a solid surface and can be used for the placement of a soap dish for storing a bar of hand soap, or for placement and storage of additional cleaning items.

Referring now to FIGS. 1-7, the kitchen sink organizer 10 is designed to include a plurality of swinging hanging rods 142 which are substantially L-shaped. Hanging rod sleeves 140 are uniformly molded at various points on the bottom reservoir base section 40 and the upper storage section 60 for releasably receiving the swinging hanging rods 142. The swinging hanging rods 142 can be rotated to lie flat against the kitchen sink organizer 10 when not in use, or alternatively can be rotated to extend outwardly from a range of zero to one hundred eighty degrees from a stored position, in a substantially perpendicular position to the side walls 24, 26 of the kitchen sink organizer 10, to provide a means for the hanging of damp dish towels or rubber cleaning gloves. The hanging rod sleeves 140 are shown in the drawings to be molded at points on the left and right outer walls 24, 26 of the bottom reservoir base section 40 and the upper section 60 such that one swinging hanging rod 142 is located slightly above a second swinging hanging rod 142 located on a corresponding wall when in a stored position on the left wall 26 or the right wall 24.

While there has been described the preferred embodiment of this invention, it will be obvious to those skilled in the art that various other embodiments, changes, equivalents, and modifications may be made therein without departing from the spirit of scope of this invention. It is therefore aimed to cover all such changes, equivalents, and modifications as fall within the spirit and scope of the invention. For example, the invention could incorporate fewer swinging rods 142, or an upper section that has no drainage channels or separation into two compartments. The invention could be formed from a variety of materials from colored plastic to a lightweight metal such as aluminum or stainless steel to accommodate a variety of finishes desired by the end user.

The invention is not limited in its application to the details of construction and to the arrangements of the components set forth in the description above or illustrated in the drawings. The invention is capable of other embodiments and of being practiced and carried out in various ways. It is to be understood that the terminology employed herein is for the purpose of the description and should not be regarded as limiting.

I claim:

1. A kitchen sink organizer consisting of:
a housing comprised of:
- a central body, wherein said central body includes a central body left side wall, and a central body right side wall opposite said central body left side wall, a central body rear wall substantially perpendicular to said central body left side wall and said central body right side wall, and a central body front wall opposite said rear wall;
- a base section at a first distal position from said central body, wherein said base section extends outwardly from central body and includes a reservoir for storage of liquid detergent, wherein said reservoir is formed from a base section left side wall, a base section right side wall, a base section front wall, and a base section rear wall opposite said base section front wall, wherein said base section front wall and said base section rear wall are substantially perpendicular to said base section left side wall and said base section right side wall, and wherein said reservoir includes a reservoir upper lip wherein said reservoir upper lip is substantially U-shaped and is formed from the upper edges of said base section left side wall, said base section right side wall, and said base section front wall, and wherein said reservoir includes an inner bottom surface, wherein said inner bottom surface is designed to extend downwardly from said base section rear wall toward said base section front wall, and wherein said base section includes an outer bottom surface opposite said inner bottom surface of said reservoir, wherein said outer bottom surface is substantially planar;
- and an organizer upper section opposite said base section at a second distal position from said central body, wherein said organizer upper extends outwardly from said central body at a distance different than the base section and includes an upper left wall, an upper right wall opposite said upper left wall, an upper front wall substantially perpendicular to said upper right wall and said upper left wall, and an upper section bottom section, wherein an open storage area is formed;

a base insert, wherein said base insert is designed and configured to be releasably placed within said reservoir of said base section, wherein said base insert includes a base insert top surface, a base insert bottom surface opposite thereto, a base insert left wall, and a base insert right wall opposite said base insert left wall, a base insert rear wall and a base insert front edge, wherein said base insert top surface and said base insert bottom surface extend downwardly from said base insert rear wall toward said base insert front edge, and wherein said base insert includes a plurality of open channels wherein said plurality of open channels form openings through said base insert top surface to said base insert bottom surface to provide a means for application of said liquid detergent onto a cleaning implement through said plurality of open channels;

and said upper front wall of said organizer upper section includes an outer surface and in inner surface opposite thereto, and wherein said outer surface includes a jewelry hook uniformly molded onto said outer surface for the storage of a ring or wrist watch.

2. A kitchen sink organizer consisting of:
a housing comprised of:
- a central body, wherein said central body includes a central body left side wall, and a central body right side wall opposite said central body left side wall, a central body rear wall substantially perpendicular to said central body left side wall and said central body right side wall, and a central body front wall opposite said rear wall;
- a base section at a first distal position from said central body, wherein said base section extends outwardly from central body and includes a reservoir for storage of liquid detergent, wherein said reservoir is formed from a base section left side wall, a base section right side wall, a base section front wall, and a base section rear wall opposite said base section front wall, wherein said base section front wall and said base section rear wall are substantially perpendicular to said base section left side wall and said base section right side wall, and wherein said reservoir includes a reservoir upper lip wherein said reservoir upper lip is substantially U-shaped and is formed from the upper edges of said base section left side wall, said base section right side wall, and said base section front wall, and wherein said reservoir includes an inner bottom surface, wherein said inner bottom surface is designed to extend downwardly from said base section rear wall toward said base section front wall, and wherein said base section includes an outer bottom surface opposite said inner bottom surface of said reservoir, wherein said outer bottom surface is substantially planar;
- and an organizer upper section opposite said base section at a second distal position from said central body, wherein said organizer upper extends outwardly from said central body at a distance different than the base section and includes an upper left wall, an upper right wall opposite said upper left wall, an upper front wall substantially perpendicular to said upper right wall and said upper left wall, and an upper section bottom section, wherein an open storage area is formed;

a base insert, wherein said base insert is designed and configured to be releasably placed within said reservoir of said base section, wherein said base insert includes a base insert top surface, a base insert bottom surface opposite thereto, a base insert left wall, and a base insert right wall opposite said base insert left wall, a base insert rear wall and a base insert front edge, wherein said base insert top surface and said base insert bottom surface extend downwardly from said base insert rear wall toward said base insert front edge, and wherein said base insert includes a plurality of open channels wherein said plurality of open channels form openings through said base insert top surface to said base insert bottom surface to provide a means for application of said liquid detergent onto a cleaning implement through said plurality of open channels;

a plurality of reservoir covers, wherein each of said reservoir covers is substantially rectangular with a reservoir cover left wall, a reservoir cover right wall opposite thereto, a reservoir cover front wall and a reservoir cover rear wall opposite thereto, a reservoir cover top surface and a reservoir cover bottom surface opposite thereto, wherein each of said reservoir cover top surfaces includes a recessed center and a circumferential flange around said recessed center such that said circumferential flange of each of said plurality of reservoir covers van be releasably placed onto said reservoir upper lip.

3. The kitchen sink organizer of claim 2 wherein said reservoir upper lip includes a plurality of cut outs wherein each of said cut outs extends downwardly from said reservoir upper lip and wherein each of said circumferential flanges of said reservoir covers can be slidingly placed into said plurality of cut outs to allow access to said reservoir.

4. The kitchen sink organizer of claim 2 wherein each of said recessed centers of said plurality of reservoir covers includes a plurality of open channels to allow passage of liquid.

5. A kitchen sink organizer consisting of:
   a housing comprised of:
      a central body, wherein said central body includes a central body left side wall, and a central body right side wall opposite said central body left side wall, a central body rear wall substantially perpendicular to said central body left side wall and said central body right side wall, and a central body front wall opposite said rear wall;
      a base section at a first distal position from said central body, wherein said base section extends outwardly from central body and includes a reservoir for storage of liquid detergent, wherein said reservoir is formed from a base section left side wall, a base section right side wall, a base section front wall, and a base section rear wall opposite said base section front wall, wherein said base section front wall and said base section rear wall are substantially perpendicular to said base section left side wall and said base section right side wall, and wherein said reservoir includes a reservoir upper lip wherein said reservoir upper lip is substantially U-shaped and is formed from the upper edges of said base section left side wall, said base section right side wall, and said base section front wall, and wherein said reservoir includes an inner bottom surface, wherein said inner bottom surface is designed to extend downwardly from said base section rear wall toward said base section front wall, and wherein said base section includes an outer bottom surface opposite said inner bottom surface of said reservoir, wherein said outer bottom surface is substantially planar;
      an organizer upper section opposite said base section at a second distal position from said central body, wherein said organizer upper extends outwardly from said central body at a distance different than the base section and includes an upper left wall, an upper right wall opposite said upper left wall, an upper front wall substantially perpendicular to said upper right wall and said upper left wall, and an upper section bottom section, wherein an open storage area is formed;
      a plurality of elongated rods, and a plurality of rod sleeves uniformly molded onto said housing, wherein each of said plurality of elongated rods are substantially L-shaped and are designed to slidingly and rotatingly fit into each of said plurality of rod sleeves such that each of said plurality of elongated rods can be positioned in a plurality of positions with respect to said housing for the hanging of dish towels, or rubber gloves or storage substantially flat against said housing;
   a base insert, wherein said base insert is designed and configured to be releasably placed within said reservoir of said base section, wherein said base insert includes a base insert top surface, a base insert bottom surface opposite thereto, a base insert left wall, and a base insert right wall opposite said base insert left wall, a base insert rear wall and a base insert front edge, wherein said base insert top surface and said base insert bottom surface extend downwardly from said base insert rear wall toward said base insert front edge, and wherein said base insert includes a plurality of open channels wherein said plurality of open channels form openings through said base insert top surface to said base insert bottom surface to provide a means for application of said liquid detergent onto a cleaning implement through said plurality of open channels.

\* \* \* \* \*